United States Patent [19]
Smyth, Jr. et al.

[11] Patent Number: 5,213,816
[45] Date of Patent: May 25, 1993

[54] POLYMER COATED POWDER HEATING AND FEEDING SYSTEM FOR A COMPACTING PRESS

[75] Inventors: Dale C. Smyth, Jr., Lawrenceburg, Ind.; Michael A. Halley, Fairfield, Ohio

[73] Assignee: Cincinnati Incorporated, Cincinnati, Ohio

[21] Appl. No.: 708,508

[22] Filed: May 31, 1991

[51] Int. Cl.$^5$ .............................. B29C 31/06
[52] U.S. Cl. .................... 425/78; 425/219; 425/257; 425/258; 425/448
[58] Field of Search ........ 425/200, 209, 219, 256–260, 425/406, 447, 448, 78, 261, 412

[56] References Cited

U.S. PATENT DOCUMENTS

| | | | |
|---|---|---|---|
| 2,839,786 | 6/1958 | Alesi | 425/258 |
| 3,832,107 | 8/1974 | Cox et al. | 425/258 |
| 3,988,088 | 10/1976 | King et al. | 425/258 |
| 4,327,996 | 5/1982 | Affolder | 425/258 |

FOREIGN PATENT DOCUMENTS 50-7084  3/1975  Japan ................... 425/258

*Primary Examiner*—Jay H. Woo
*Assistant Examiner*—James P. Mackey
*Attorney, Agent, or Firm*—Frost & Jacobs

[57] ABSTRACT

A system for heating and feeding polymer coated powder to a heated die cavity of a compacting press. The system includes at least one heated vertical pipe for heating the polymer coated powder and for delivering the polymer coated powder by gravity from source thereof to the entry end of at least one horizontally oriented auger conveyor. The at least one auger conveyor is heated and imparts heat to the individual powder particles through a mixing action. The at least one auger conveyor delivers the polymer coated powder to the heated hopper of a shuttle assembly. The shuttle assembly is shiftable between a retracted position wherein the polymer coated powder is discharged from the shuttle hopper to a heated powder ring, to an extended position wherein the polymer coated powder is discharged from the powder ring to the heated die cavity of the compacting press. The system heats the individual particles of the polymer coated powder to a temperature just below the coagulation point thereof. The temperature of the polymer coated powder is rapidly increased to the "set" point by the combination of the heated die cavity and the energy imparted during the actual compacting stroke.

16 Claims, 7 Drawing Sheets

POLYMER COATED POWDER HEATING AND FEEDING SYSTEM FOR A COMPACTING PRESS

TECHNICAL FIELD

The invention relates to a system which will accept a variety of polymer coated powders of metal and other materials, heat each particle to a temperature just below the coagulation point, and feed the heated powders accurately into a heated die cavity on a conventional compacting press.

BACKGROUND ART

Recently, there has been a great deal of interest in the use of a compacting press to manufacture parts from iron powders and other powders (such as non-ferrous powders, ceramic powders, and the like) where each particle of powder is coated with a very thin layer of polymer. If these powders are compacted at temperatures ranging from about 450° F. to about 550° F., the polymer materials "set" and the compacted parts have sufficient strength to eliminate the need for sintering after the compacting operation, although sintering can be practiced if desired.

In conventional compacting operations utilizing uncoated iron powder or the like, the powder is directed from a storage hopper by means of a flexible hose to the hopper of a delivery shuttle by which the powder is shifted to a die cavity in a measured amount. Difficulties are encountered, however, when attempting to use the same sort of delivery system for polymer coated powder wherein the powder is delivered to a heated die and held for a time sufficient to heat the powder to its desired temperature before the compacting operation. First of all, this approach is very time consuming. In addition, however, it causes localized over-heating where the powder is in contact with the heated die. The polymer coating acts as a temperature insulator, and those coated particles in the interior of the mass are slow to heat, while the polymer-coated particles adjacent the heated die "set" before the interior particles are hot enough to compact.

Attempts have also been made to heat the coated powder by external means to a temperature just below the "set" temperature prior to loading the coated powder into the die cavity. It is characteristic of the powder that it starts to coagulate and become "tacky" at a temperature of about 350° F. Since the usual production compacting method requires accurate gravity-controlled filling of the powder into the die cavity from a delivery shuttle, any coagulation or tackiness of the coated powder causes variations in the amount of powder that actually is deposited in the die cavity.

The present invention is directed to a coated powder delivery system which will overcome the above-noted problems. The delivery system of the present invention will accept a variety of polymer coated powders of metal or other materials. Each coated particle is heated to a temperature just below the coagulation point. The heated powders are accurately fed into a heated die cavity on a conventional compacting press. The remaining increase in temperature to the "set" point is then rapidly achieved during a standard compacting cycle by a combination of the heated tooling and the energy imparted during the actual compacting stroke.

DISCLOSURE OF THE INVENTION

According to the invention, there is provided a system for heating and feeding polymer coated powder into a heated die cavity of a compacting press. The system comprises at least one auger assembly and at least one shuttle assembly. The at least one auger assembly comprises a vertical pipe and a horizontally oriented auger conveyor. The auger conveyor has an entry port and a discharge end. The vertical pipe has an upper end releasably connected to a source of the polymer coated powder. The vertical pipe has a lower end connected to the entry port of the horizontal auger conveyor. The vertical pipe has a heating element wrapped about its periphery. The auger conveyor has a first heating element wrapped about its periphery and extending from its entry port toward its discharge end. The auger conveyor has a second heating element extending from the first heating element to its discharge end. The vertical pipe heater imparts heat to the polymer coated powder. The auger conveyor heaters impart heat to the individual powder particles through a mixing action.

The shuttle assembly comprises a fixed portion supporting a heated shuttle hopper, and a movable portion supporting a heated powder ring. The discharge end of the auger conveyor is located over the fixed hopper of the shuttle assembly.

The movable portion of the shuttle assembly is shiftable between a retracted position wherein the upper end of the powder ring is coaxial with and open to the shuttle hopper and the lower end of the powder ring is closed, and an extended position wherein the lower end of the powder ring is coaxial with and open to the die cavity of the compacting press and the discharge end of the shuttle hopper is closed. The heaters of the vertical tube, the auger conveyor, the shuttle hopper and the shuttle powder ring heat the individual particles of the polymer coated powder to a temperature just below the coagulation point thereof.

In a preferred embodiment of the present invention, two substantially identical auger assemblies are provided, each having a discharge end located over the fixed hopper of the shuttle assembly. In normal operation, both auger assemblies operate simultaneously.

DETAILED DESCRIPTION OF THE INVENTION

Figure 1:
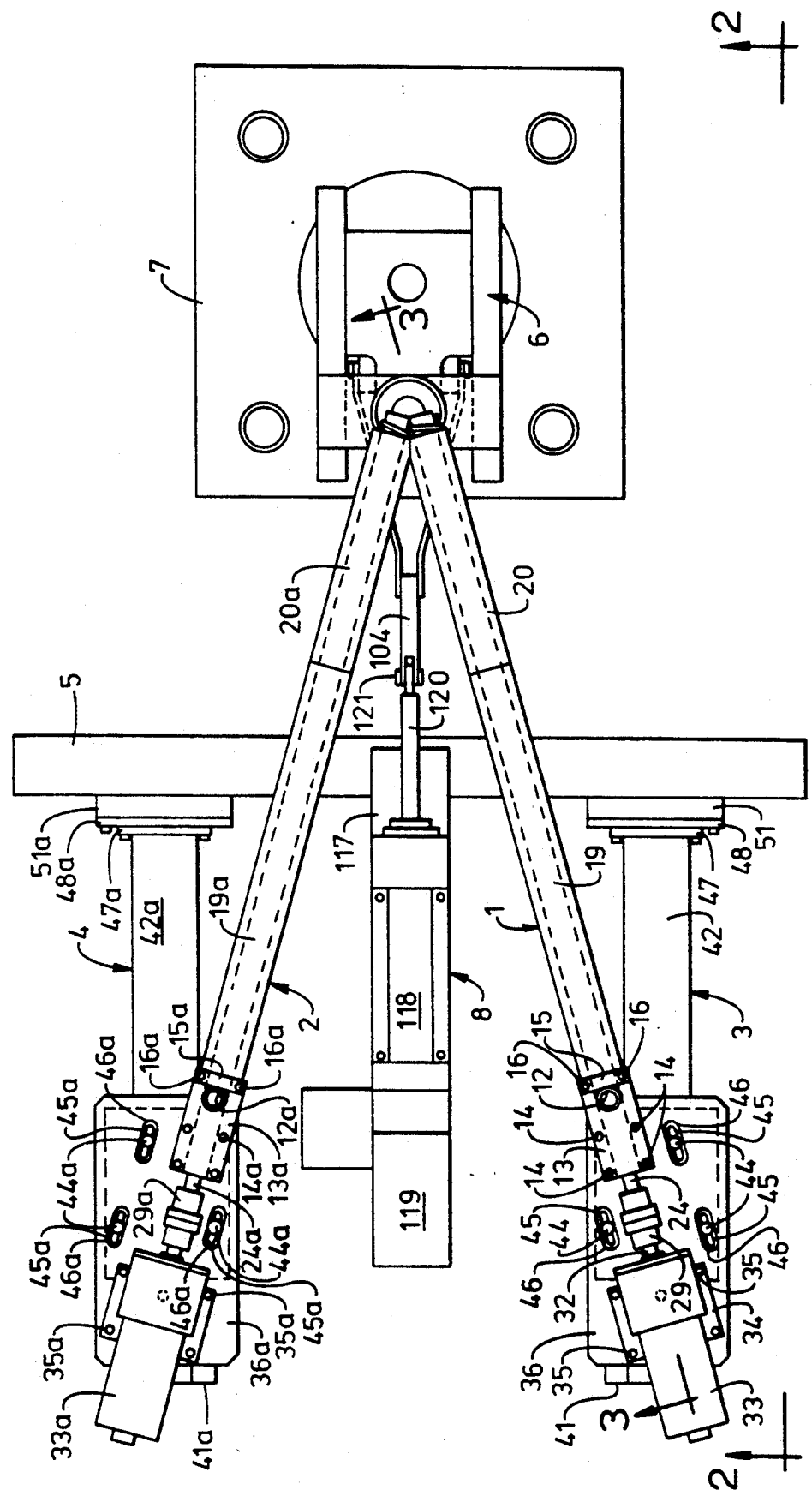
FIG. 1 is a simplified plan view of the feed system of the present invention.

Reference is first made to FIG. 1 which is a simplified plan view of the polymer coated powder feed system of the present invention. The feed system comprises a pair of substantially identical auger assemblies generally indicated at 1 and 2, respectively. The auger assemblies 1 and 2 are mounted on support assemblies generally indicated at 3 and 4, respectively. The support assemblies 3 and 4 are adjustably mounted on a tubular steel bracket 5. The bracket 5, in turn, is affixed to the frame (not shown) of a conventional compacting press. The feed system of the present invention also includes a shuttle assembly, generally indicated at 6, and mounted on the die supporting assembly 7 of the compacting press. The movable portion of the shuttle assembly 6 is shiftable longitudinally between a retracted position and an extended position by a shuttle actuating assembly generally indicated at 8. The shuttle actuating assembly 8, in turn, is supported on the bracket 5.

Figure 2:
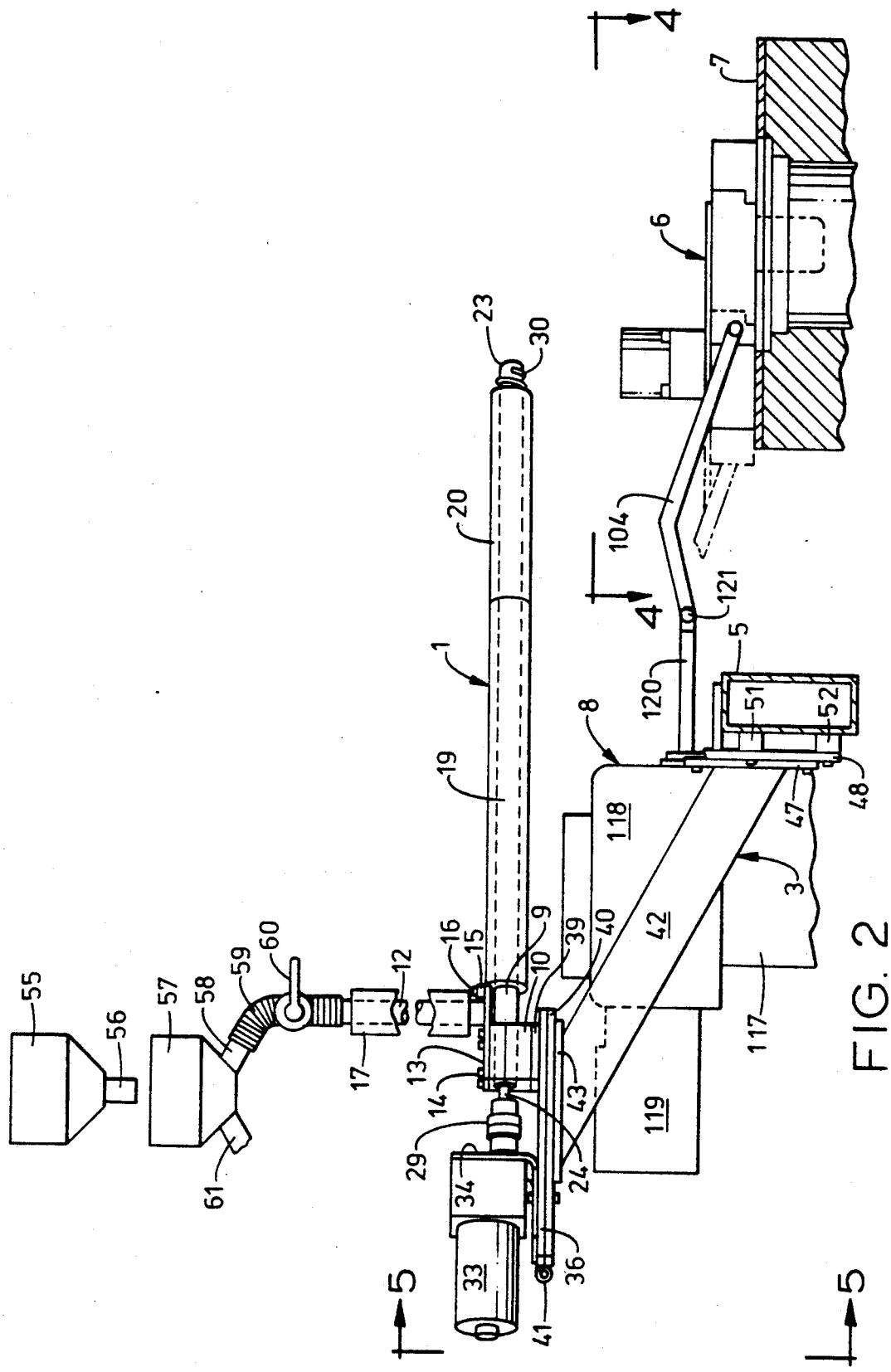
FIG. 2 is a fragmentary side elevational view of the structure of FIG. 1 as viewed from the line 2—2 thereof.
Figure 3:
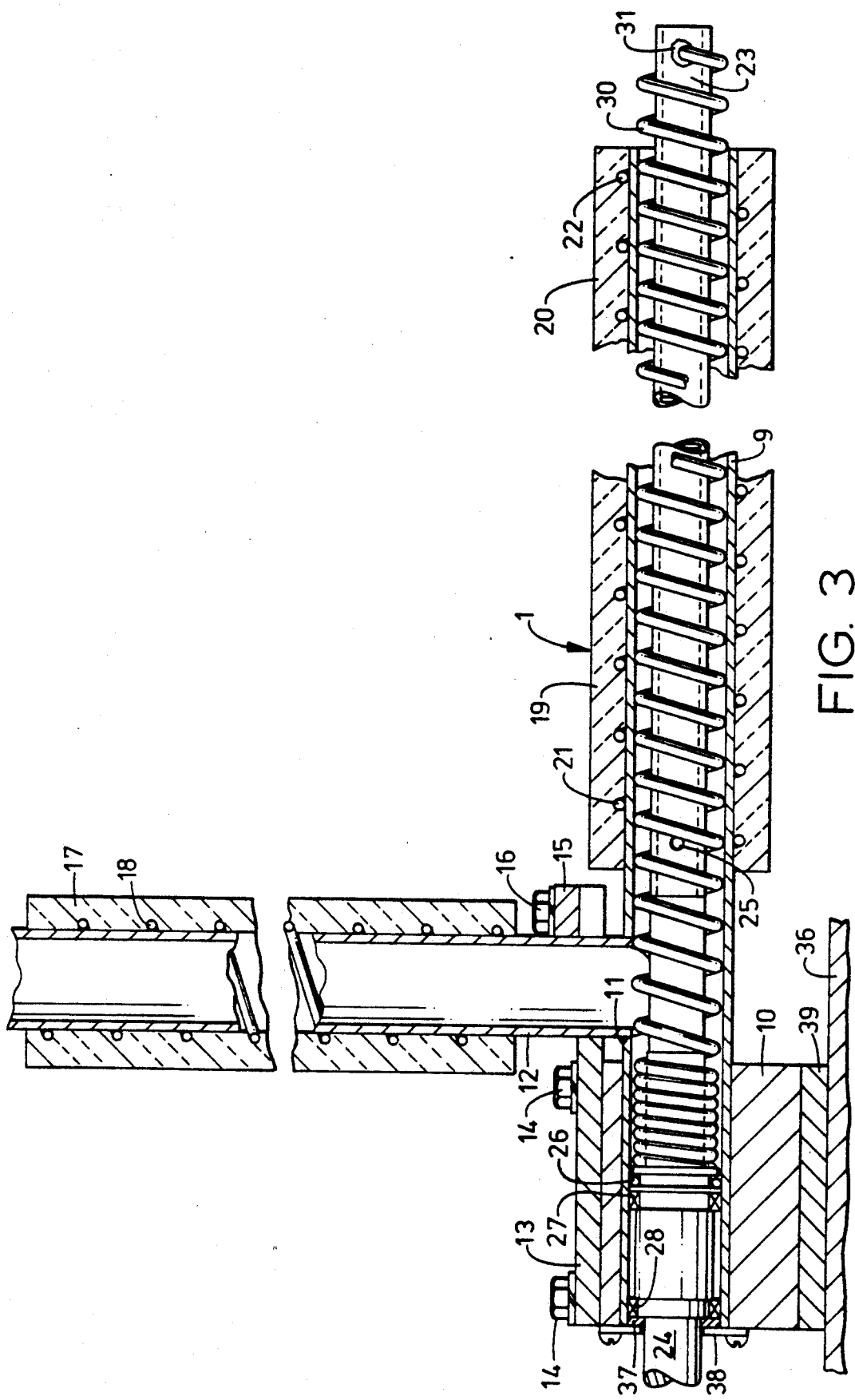
FIG. 3 is a fragmentary cross-sectional view taken along section line 3—3 of FIG. 1.

Reference is now made to FIGS. 1, 2 and 3 wherein the auger assembly 1 is most clearly shown. Since the auger assemblies 1 and 2 are substantially identical, a description of auger assembly 1 can also serve as a description of auger assembly 2.

The auger assembly 1 comprises a horizontal tube 9, the rearward end of which is supported in a mounting block 10. Near the mounting block 10, the horizontal tube 9 has an opening 11 formed therein to receive the lower end of a vertical tube 12. The vertical tube 12 is welded or otherwise appropriately affixed to the horizontal tube 9 and is additionally supported by a plate 13. The plate 13 is affixed to mounting block 10 by a series of cap screws 14. The forward end of plate 13 is bifurcated and the vertical tube 12 is received between the bifurcations. A retainer plate 15 extends across the ends of the bifurcations and is affixed thereto by a pair of cap screws 16. As is shown in FIGS. 2 and 3, the vertical tube 12 is wrapped throughout the majority of its length by insulation 17 and a heating element 18 Similarly, that portion of horizontal tube 9 extending forwardly of vertical tube 12 is wrapped by a pair of insulation elements 19 and 20, and a pair of heating elements 21 and 22. It will be noted that the insulation element 19 is somewhat longer than the insulation element 20.

Mounted within horizontal tube 9 there is an inner tube 23. The forwardmost end of inner tube 23 extends slightly beyond the forward end of horizontal tube 9. The rearward end of inner tube 23 is affixed to a shaft 24 as at 25. The shaft 24 carries a sealing ring 26 forming a seal between the shaft and the horizontal tube 9. The assembly of the shaft 24 and the inner tube 23 is rotatable within horizontal tube 9 by virtue of bearings 27 and 28. The rearward end of shaft 24 is connected to a coupling 29, as is shown in FIGS. 2 and 3.

The inner tube 23 is surrounded by a helical spring 30. The forward end of the helical spring 30 is welded to the inner tube forward end as at 31. The rearward end of helical spring 30 is engaged on the shaft 24 adjacent seal 26. The helical spring 30 rotates with inner tube 23 and shaft 24 within horizontal tube 9 and converts the inner tube 23 and shaft 24 into an auger.

The coupling 29 is connected to the shaft 32 of an electric motor 33. Electric motor 33 is provided with a mounting bracket 34. The mounting bracket 34 is attached by cap screws 35 to drive mounting plate 36.

Mounting block 10 is provided with a thrust bearing 37 and a cover plate 38 for shaft 24. The mounting block 10 rests upon a heat insulative plate 39. The cap screws 14 extend through plate 13, mounting block 10, insulative plate 39 and into drive mounting plate 36.

Reference is now made to FIGS. 1 and 2. Drive mounting plate 36 overlies a lower mounting plate 40. The drive mounting plate 36 and lower mounting plate 40 are joined together at their rearward edges by a hinge 41, the purpose of which will be apparent hereinafter.

The support assembly 3 for the auger assembly 1 comprises an elongated upwardly and rearwardly extending arm 42. As is most clearly seen in FIG. 2, the upper end of arm 42 terminates in a horizontal end plate 43. The lower mounting plate 40 is affixed to upper end plate 43 by three cap screws 44 (see FIG. 1). Each of the cap screws 44 passes through an elongated slot 45 in lower mounting plate 40 and is threadedly engaged in the upper end plate 43. It will be noted from FIG. 1 that the drive mounting plate 36 is provided with elongated and enlarged openings 46, providing access to cap screws 44 and their respective slots 45. This arrangement enables the auger assembly 1 to be adjusted in position to assure that the forwardmost end of horizontal tube 9 is properly located with respect to the hopper of the shuttle assembly, to be described hereinafter.

Figure 5:
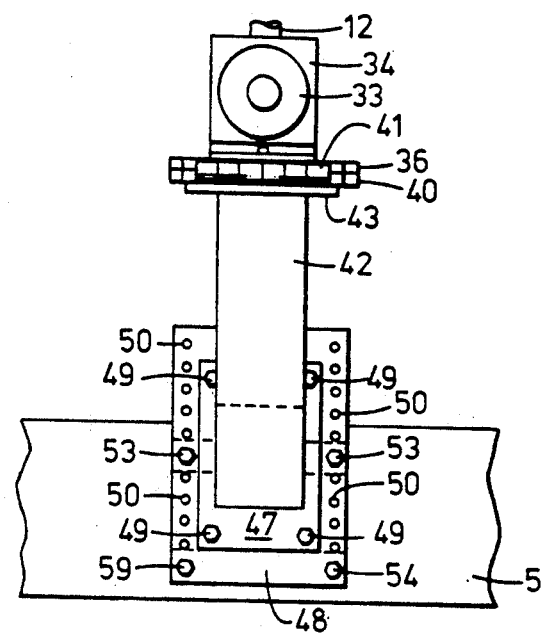
FIG. 5 is a fragmentary elevational view as seen from the line 5—5 of FIG. 2.

Reference is now made to FIGS. 1, 2 and 5. The lower end of arm 42 terminates in a vertical mounting plate 47. Vertical mounting plate 47, in turn, is attached to an adjustable mounting plate 48 by cap screws 49. The vertical edges of adjustable mounting plate 48 are provided with a plurality of perforations 50.

As is most clearly shown in FIG. 2, the tubular steel bracket 5 has a pair of horizontal spacers 51 and 52 affixed thereto. The adjustable mounting assembly plate 48 is affixed to horizontal spacers 51 and 52 by pairs of cap screws 53 and 54, respectively, passing through selected ones of the adjustable mounting plate perforations 50. This arrangement permits a vertical adjustment of auger assembly 1 so that the vertical position of the end of auger assembly tube 9 can be adjusted with respect to the hopper of shuttle assembly 6.

As indicated above, the auger assembly 2 and its support assembly 4 are substantially identical to auger assembly 1 and support assembly 3. To this end, like parts of auger assembly 2 and support assembly 4 have been given the same index numerals as auger assembly 1 and support assembly 3, followed by "a."

The auger assembly portion of the present invention is completed by means to introduce a supply of the polymer coated powder into the vertical tubes 12 and 12a of the auger assemblies 1 and 2. Such a means is shown in simplified form in FIG. 2.

To this end, a first hopper 55 is provided, into which the operator unloads a supply of the polymer coated powder, as required. The hopper 55 has an outlet 56 leading to a second hopper 57 which assures that a constant supply of the polymer coated powder is present. The second hopper 57 is provided with an outlet 58 to which a flexible conduit or hose 59 is attached. The lower end of the flexible hose 59 is removably affixed to the upper end of vertical tube 12 of auger assembly 1. The flexible hose 59 has a hand operated valve 60 located therein by which the supply of polymer coated powder supplied to vertical tube 12 can be started, stopped or regulated. In a similar fashion, the second hopper 57 has a second outlet 61 to which a second flexible hose containing a valve (not shown) will be attached. This second hose will be removably connected to the upper end of vertical tube 12a of auger assembly 2, and will function in the same manner.

It is important that the connection between the flexible hose 59 and the upper end of vertical tube 12 be readily disconnectable. It would be possible, for example, to provide the upper end of vertical tube 12 with a funnel-shaped member into which the lower end of flexible hose 59 loosely extends. In any event, with the flexible hose 59 disconnected from vertical tube 12, the entire auger assembly mounted on drive mounting plate 36 can be pivoted rearwardly in a clockwise direction about hinge 41. In this rearwardly pivoted position, auger assembly 1 can be cleaned, serviced or repaired while auger assembly 2 remains in service. It will be understood that auger assembly 2 can similarly be disconnected from its flexible hose (not shown) and pivoted to an out of service position for purposes of cleaning, maintenance and repair.

Figure 4:
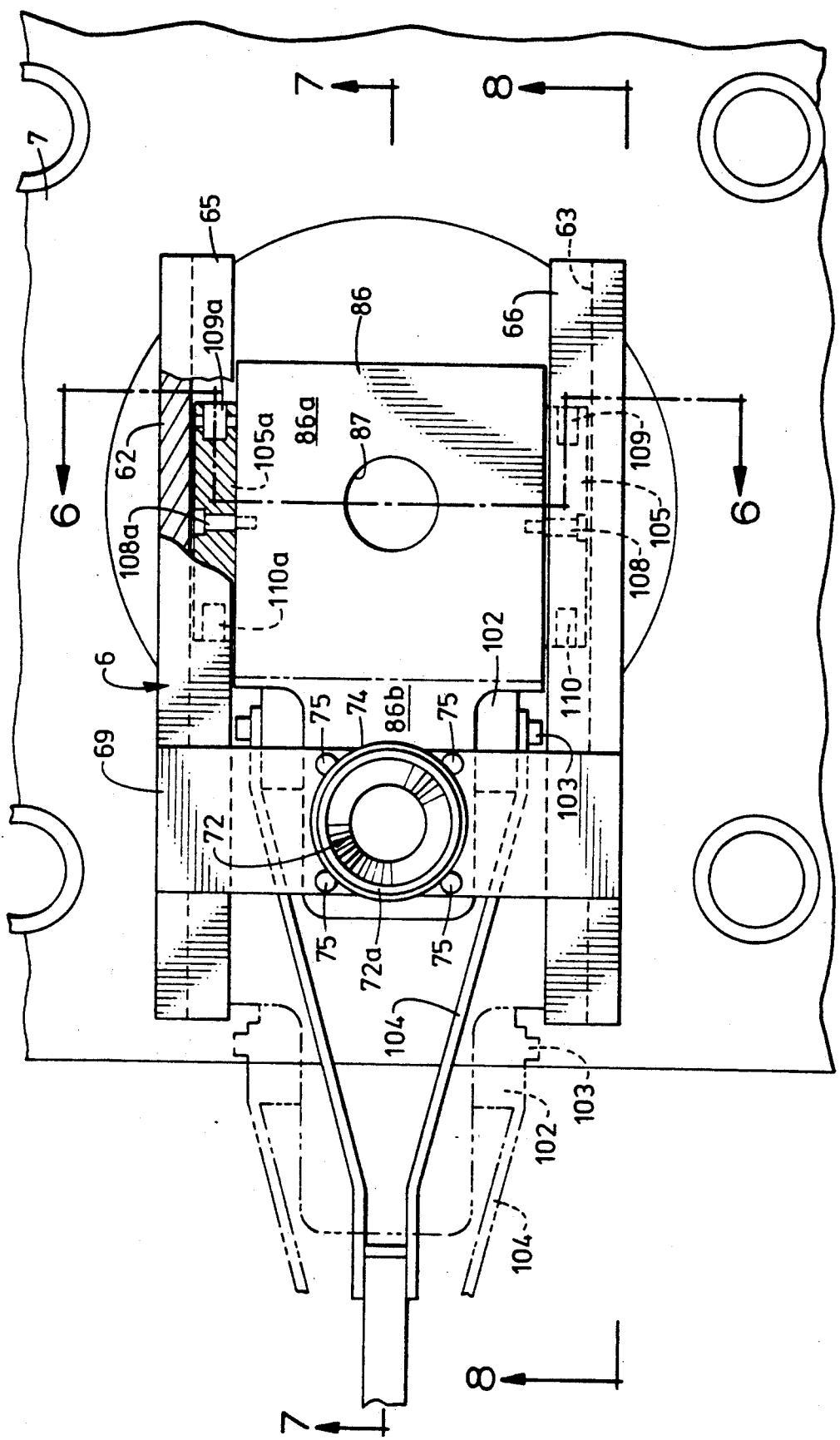
FIG. 4 is a fragmentary plan view as seen from the line 4—4 of FIG. 2.
Figure 6:
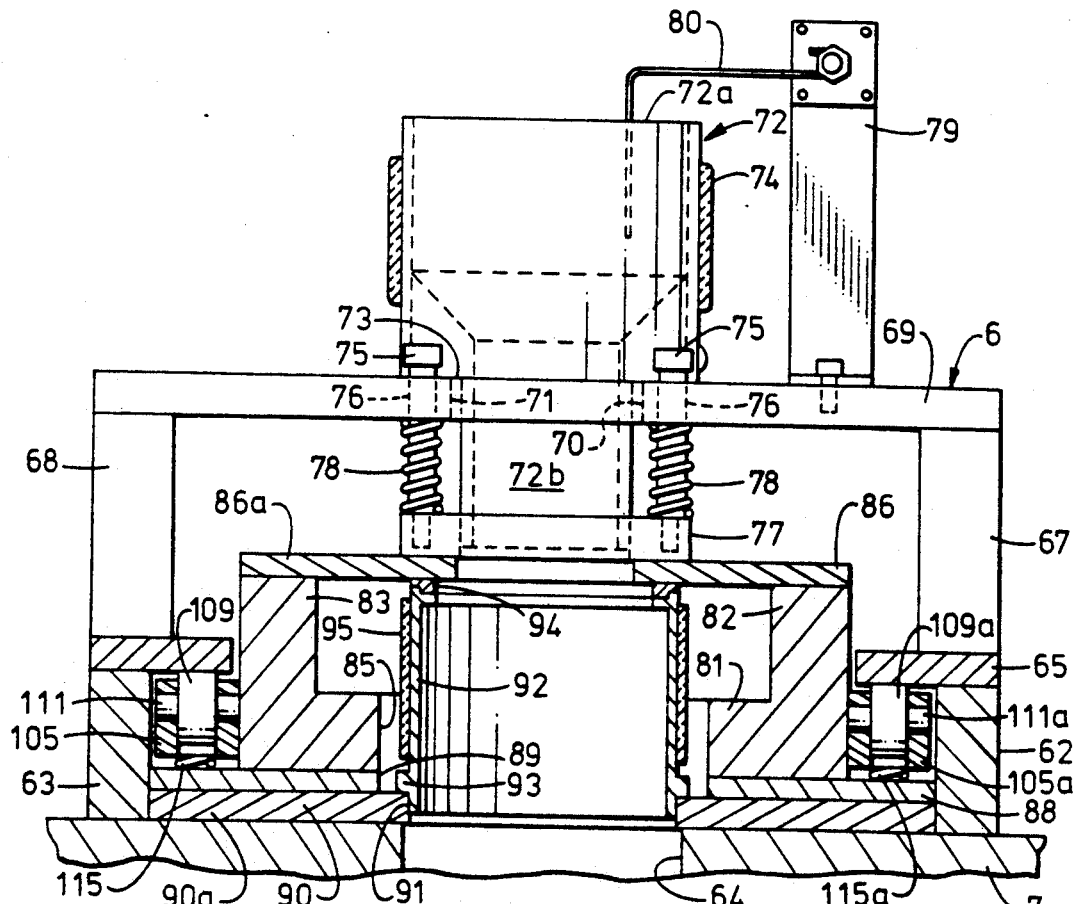
FIG. 6 is a fragmentary cross-sectional view of the shuttle assembly of the present invention taken along section line 6—6 of FIG. 4.

The shuttle assembly 6, of FIG. 1, mounted on the die supporting assembly 7, will next be described. Reference is made to FIGS. 4 and 6. The shuttle assembly 6 comprises a pair of guide walls 62 and 63. Guide walls 62 and 63 comprise elongated members removably affixed to the upper surface of the die supporting assembly 7 in parallel spaced relationship and to either side of the die cavity 64. The guide walls 62 and 63 may be affixed to the upper surface of the die supporting assembly 7 by any appropriate means such as thumb screws or the like (not shown) so that they may be readily removable. The guide walls 62 and 63 support horizontally oriented rails 65 and 66, respectively, the purpose of which will be apparent hereinafter. Mounted above rails 65 and 66 is a pair of riser blocks 67 and 68, respectively. Riser blocks 67 and 68, in turn, support a horizontally oriented hopper plate 69. The hopper plate 69 has a central perforation 70 mounting an insulative bushing 71.

The shuttle assembly 6 is provided with a hopper generally indicated at 72. The hopper 72 has an upper cylindrical portion 72a and a lower cylindrical portion 72b of lesser diameter with an annular shoulder 73 formed therebetween. The hopper 72 is so located that its lower portion 72b extends through the insulative bushing 71 and its upper portion is located above hopper plate 69, with the annular shoulder 73 resting upon hopper plate 69. The upper portion 72a of shuttle hopper 72 is surrounded by a heating element 74.

As is most clearly shown in FIGS. 4 and 6, the hopper 72 is surrounded by four bolts 75 which extend with clearance through perforations 76 in hopper plate 69. The lowermost ends of bolts 75 are threadedly engaged in a sealing and wiping ring 77 which surrounds the lower portion 72b of the shuttle hopper 72. Each of the four bolts 75 mounts a compression spring 78. Each compression spring has its upper end abutting the underside of hopper plate 69 and its lower end abutting the upper surface of sealing and wiping ring 77. As a result, the compression springs 78 constantly urge the sealing and wiping ring 77 downwardly. The reason for this arrangement will be apparent hereinafter.

The hopper plate 69 supports an upstanding bracket 79 (see FIG. 6). The upstanding bracket 79, in turn, supports a probe-like capacitive level sensor 80. The sensor 80 has a free end which extends downwardly into the upper portion 72a of the shuttle hopper 72. This last mentioned portion of the sensor senses the height of the polymer coated powder in the upper portion 72a of shuttle hopper 72.

Those parts of the shuttle assembly thus far described constitute the stationary elements of the shuttle assembly. The shiftable elements of the shuttle assembly will next be described.

Figure 7:
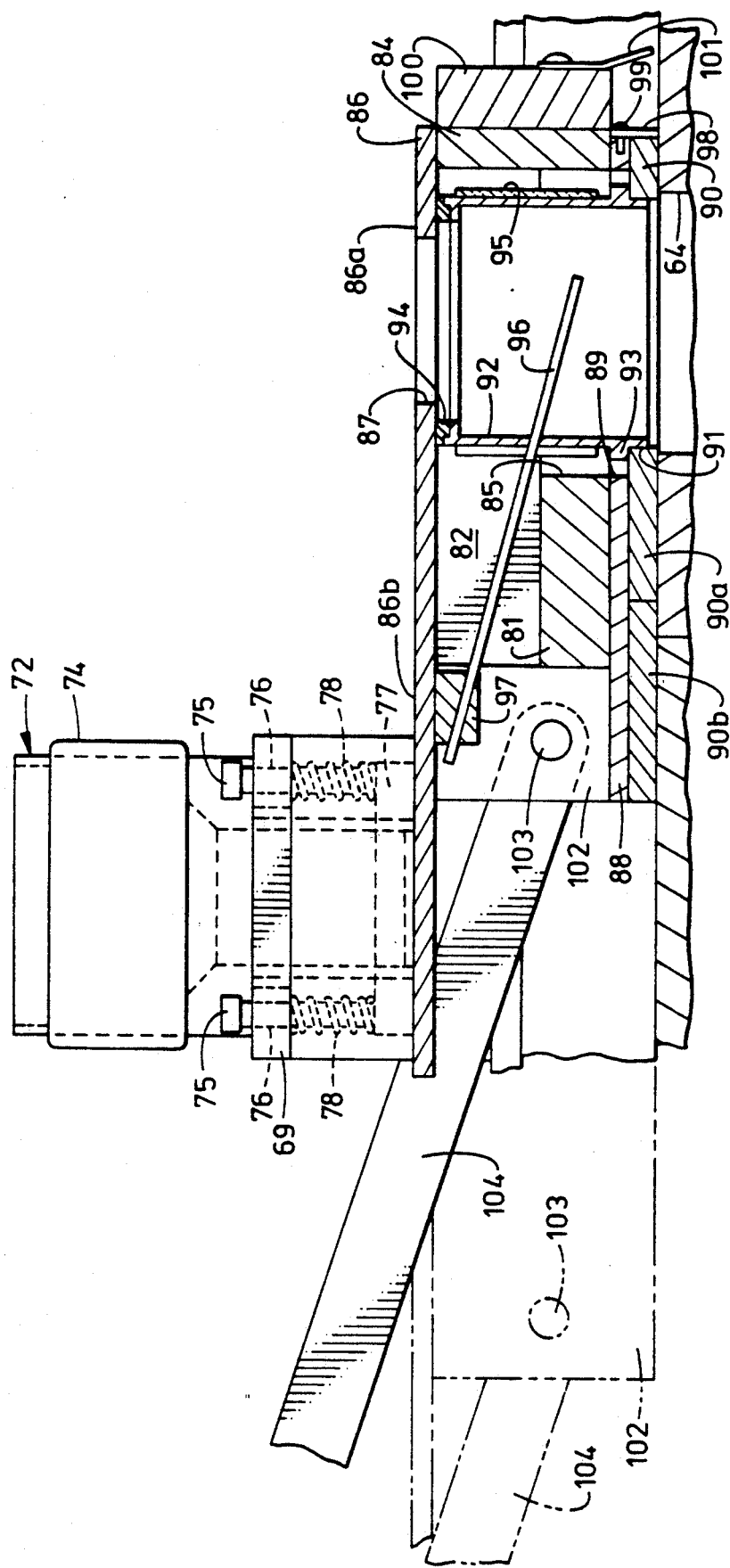
FIG. 7 is a fragmentary cross-sectional view of the shuttle assembly of the present invention taken along section line 7—7 of FIG. 4.

The shuttle assembly includes a shuttle body 81. As is most clearly seen in FIGS. 6 and 7, the shuttle body 81 comprises a thick metallic plate having upstanding side walls 82 and 83 and an upstanding front wall 84 (see FIG. 7). The base portion of the shuttle body 81 has a circular perforation 85 formed therein.

The upper edges of the shuttle body side walls 82 and 83 and the shuttle body front wall 84 are coplanar and support an upper cut-off plate 86. As is most clearly shown in FIG. 4, the upper cut-off plate 86 has a main rectangular portion 86a and a rearwardly directed narrow extended portion 86b. The main portion 86a of the upper cut-off plate 86 has a perforation 87 formed therein. The perforation 87 is coaxial with the perforation 85 in the shuttle body 81. The upper cut-off plate 86 is affixed to the upper edges of shuttle body sides 82 and 83 and the shuttle body front wall 84 by cap screws (not shown) or the like.

The shuttle body 81 rests upon a lower shuttle plate 88. The lower shuttle plate 88 has a perforation 89 therein which is coaxial with the shuttle body perforation 85 and of substantially the same diameter. Finally, the lower shuttle plate 88 rests upon a bearing plate 90 made up of two distinct parts, a front part 90a and a rear part 90b (see FIG. 7). The front part 90a of bearing plate 90 has a perforation 91 formed therein which is coaxial with the perforation 85 of shuttle body 81 and the perforation 89 of lower shuttle plate 88, but of lesser diameter. It will be noted from FIGS. 6 and 7 that the perforation 91 is of slightly lesser diameter than the die cavity 64. The two-part bearing plate 90 and the lower shuttle plate 88 are connected together and to the shuttle body 81 by countersunk cap screws (not shown) or the like.

The shiftable structure thus far described carries a cylindrical powder ring 92. The powder ring 92 is open both at its top and at its bottom. The powder ring 92 is of a diameter to be just nicely received in the perforation 91 of the front part 90a of bearing plate 90. Near its lower end, the powder ring 92 has an annular exterior flange 93 located within the perforation 89 in lower shuttle plate 88 and resting upon the upper surface of the front part 90a of bearing plate 90. It will be understood that the powder ring 92 is coaxial with the perforation 87 in upper cut-off plate 86, the perforation 85 in the shuttle body 81, the perforation 89 in lower shuttle plate 88 and the perforation 91 in front portion 90a of bearing plate 90. The lower end of powder ring 92 is located just above the bottom surface of the front part 90a of bearing plate 90. The upper end of powder ring 92 is located near the lower surface of upper cut-off plate 86. An annular silicon spacer 94 forms a seal between the upper end of powder ring 92 and the lower surface of upper cut-off plate 86. The powder ring 92 is surrounded by a heating element 95. A temperature probe 96 extends into the powder ring and is supported by an appropriate bracket 97 affixed to the underside of upper cut-off plate 86.

A brass scraper 98 is mounted along the forward edges of lower shuttle plate 88 and the front part 90a of bearing plate 90. Scraper 98 is affixed to the forward edge of lower shuttle plate 88 by appropriate fastening means 99. The front wall 84 of shuttle body 81 mounts a block 100 which supports a part deflector 101.

At the rearward end of shuttle body 81 there is mounted a transversely extending block 102 mounted between the rearward portion 86b of upper cut-off plate 86 and lower shuttle plate 88. The block 102 carries pivot means 103 by which the forward ends of a shuttle yoke 104 are pivotally connected to the block 102. The purpose of shuttle yoke 104 will be apparent hereinafter.

Figure 8:
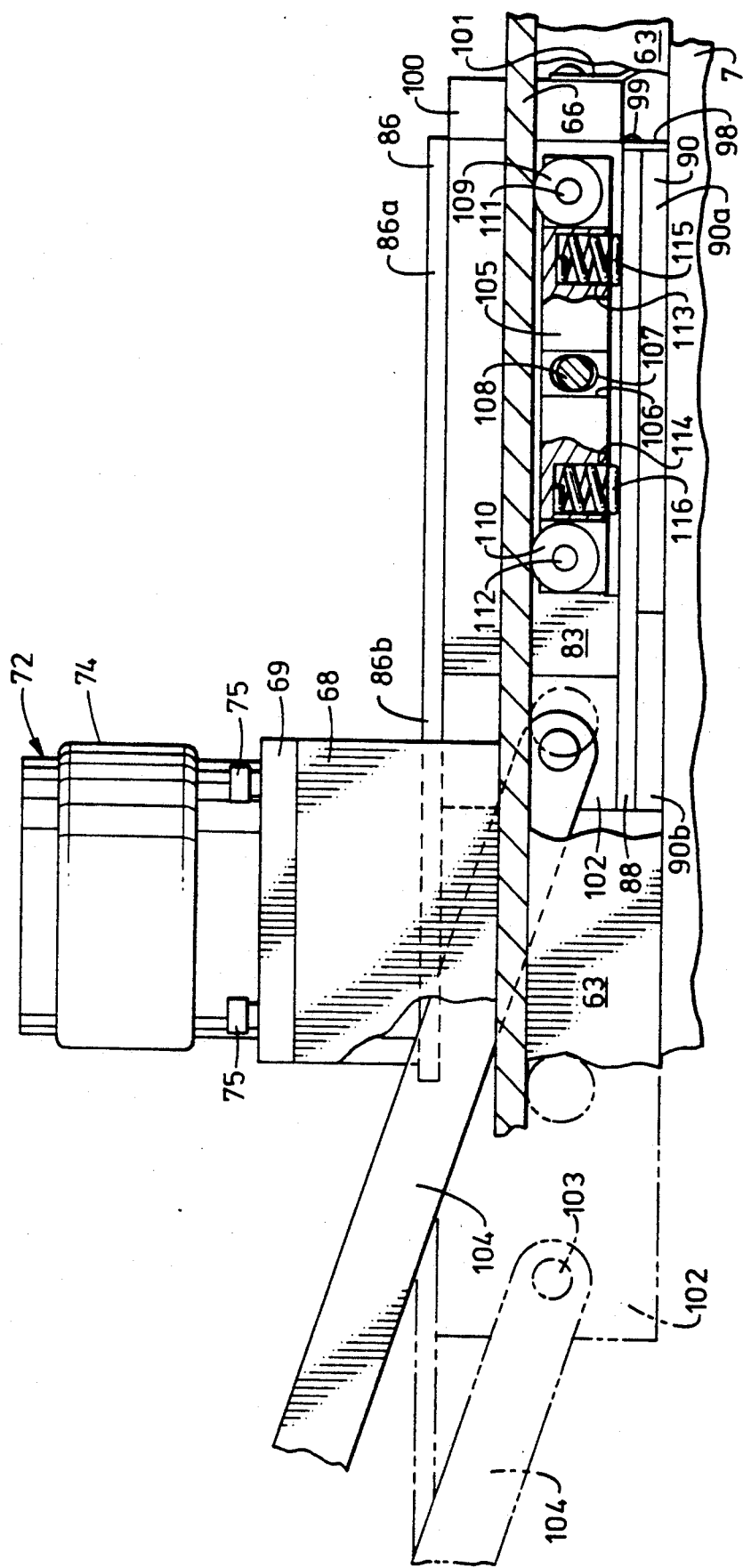
FIG. 8 is a fragmentary cross-sectional view of the shuttle assembly of the present invention taken along section line 8—8 of FIG. 4.

Referring to FIGS. 6 and 8, the lefthand side of the shuttle body 81 (as viewed in FIG. 6) supports a roller bar 105. The outside surface of the roller bar, at the center thereof, is provided with a vertically oriented slot 106. The slot 106 is further provided with a vertically elongated perforation 107 adapted to receive a shouldered screw 108 by which roller bar 105 is affixed to the side of shuttle body 81. The slot 106 accommodates the head of the shouldered screw 108. The elongated perforation 107, in combination with the shouldered screw 108 permits slight vertical shifting of the roller bar 105, as well as pivoting of the roller bar 105 about shouldered screw 108.

The ends of roller bar 105 are bifurcated and a pair of rollers 109 and 110 are located between the bifurcations. The rollers 109 and 110 are held in place by roll pins 111 and 112, respectively. The roll pins 111 and 112 pass through perforations in their respective bifurcations and in their respective rollers 109 and 110. It will be noted that the rollers 109 and 110 are so positioned as to engage the underside of rail 66.

Adjacent each of the rollers 109 and 110 the roller bar is provided with a socket 113 and 114. The lower ends of sockets 113 and 114 are open and the upper ends are closed. The sockets 113 and 114 contain compression springs 115 and 116. The upper ends of compression springs 115 and 116 abut the closed ends of their respective sockets 113 and 114. The lower ends of compression springs 115 and 116 abut the upper surface of lower shuttle plate 88. Compression springs 115 and 116 constantly urge the rollers 109 and 110 against the underside of rail 66 and at the same time urge the bearing plate parts 90a and 90b against the upper surface of the die supporting assembly 7.

Turning to FIG. 6, the right side of shuttle body 81, as viewed in FIG. 6, is similarly provided with a roller bar. This roller bar is identical to roller bar 105 and like parts have been given like index numerals followed by "a."

The above-described roller bar arrangement enables the movable portion of the shuttle assembly to shift between an extended position and a retracted position. In FIG. 1, the movable portion of the shuttle assembly is shown in its extended position. The same is true of FIG. 6. In FIGS. 2, 4, 7 and 8 the shiftable portion of the shuttle assembly is shown in its extended position in solid lines and in its retracted position in broken lines. It will be understood by one skilled in the art that when the movable portion of the shuttle assembly is in its retracted position, the powder ring 92 is coaxial with and open to the shuttle hopper 72. At the same time, the bottom end of the powder ring 92 is closed by the upper surface of the die supporting assembly 7. On the other hand, when the movable portion of the shuttle assembly is in its extended position, the powder ring 92 is coaxial with and open to the die cavity 64, while the bottom end of the shuttle hopper 72 is closed by the extended portion 86b of upper cut-off plate 86.

The means for shifting the movable part of the shuttle assembly between its extended and retracted positions is illustrated in FIGS. 1 and 2. A support 117 is mounted on bracket 5, centrally thereof. The support 117 mounts a ball screw drive 118 powered by an electric motor 119. The shaft 120 of the ball screw drive 118 is pivotally connected as at 121 to the rearward end of the shuttle yoke 104. In this manner, the movable portion of the shuttle assembly is shifted between its extended and retracted positions.

The invention having been described in detail, its manner of operation can now be set forth. When the system is running normally, the heaters 18 and 18a about vertical tubes 12 and 12a are set at a temperature of about 320° F. The heaters 21 and 21a about the auger tubes 9 and 9a are set at about 350° F. Finally, the heaters 22 and 22a about the auger tubes 9 and 9a are set at about 380° F. The polymer coated powders feed through vertical tubes 12 and 12a by gravity. As the polymer coated powders pass through the auger tubes 9 and 9a they fill approximately one-third of the tubes so that the powders during their travel through the auger tubes 9 and 9a are subjected to a stirring effect such that all of the powder particles are appropriately heated.

While not required, during the usual practice of the invention, the augers are run simultaneously and at such a speed that they operate substantially constantly. It has been found that a cycle of about 6 seconds (i.e., a production rate of about 10 parts per minute) can easily be achieved. When one of the auger systems 1 and 2 is out of service for cleaning, maintenance or repair, the auger of the other auger system can be speeded up so that production can be maintained with a minimum reduction in production rate. The appropriate ones of the heaters 18, 18a, 21, 21a and 22, 22a can be adjusted to compensate for the increased speed of the auger when just one auger system is operating.

At the beginning of a cycle, the movable portion of the shuttle assembly is in its retracted position. This causes the powder ring 92 to be located coaxially beneath the shuttle hopper 72. The bottom of the powder ring 92 will be closed by the upper surface of the die supporting assembly 7. Under these circumstances, the powder within the shuttle hopper 72 is free to discharge into the powder ring 92.

Thereafter, the movable portion of the shuttle assembly 1 is shifted forwardly to its extended position. As this movement occurs, the upper cut-off plate 86 of the movable shuttle portion closes off the bottom of the shuttle hopper 72, the upper cut-off plate 86 cooperating with the sealing and wiping ring 77. As the movable portion of the shuttle assembly 1 shifts to its extended position, the shuttle part deflector 101 will assure that a previously formed and ejected part will be shifted out of the way. At the same time, the brass scraper 98 will remove any excess lubricant accumulated on the upper surface of the die supporting assembly 7. When the movable portion of the shuttle assembly 1 reaches its forwardmost extended position, the powder ring 92 will reach a position coaxial with die cavity 69, discharging the polymer coated powder contained within the powder ring into the die cavity.

At this point, the movable portion of the shuttle assembly 76 will begin to shift rearwardly toward its retracted position. The front portion 90a of bearing plate 90 will shift across and level the polymer coated powder in the die cavity, assuring a proper measured amount is located therein. At the same time, the bearing plate parts 90a and 90b close the bottom end of the powder ring 92, which is returned to its retracted position beneath the shuttle hopper 72. At this point, the powder ring 92 is again filled with polymer coated powder from the shuttle hopper 72. At the same time, the powder within the die cavity 69 is subjected to compression by the ram of the press. The fully formed part is then ejected from the die cavity and the next cycle begins.

The heaters 18-18a, 21-21a, and 22-22a of the auger assemblies and the shuttle hopper heater 74 and powder ring heater 95 bring the particles of the polymer coated powder to a temperature just below the coagulation point. During operation, the heater 74, about the shuttle hopper, is maintained at a temperature of about 320° F. The heater 95, about the powder ring 92 is maintained at a temperature of about 320° F. The remaining increase in temperature to the "set" point of the powder during compacting is rapidly achieved by the combination of the heated tooling and the energy imparted during the actual compacting stroke. During a cycle, the level of powder in the shuttle assembly hopper is monitored by problem 80, precluding overfilling. Similarly, the temperature of the powder within powder ring 92 is monitored by probe 96.

Modifications may be made in the invention without departing from the spirit of it.

What is claimed is:

1. In a compacting press having a die with a heated die cavity, a die supporting assembly and a ram cooperating with said die to make compacted parts, a system for heating and transferring polymer-coated powder from a source thereof to said die cavity, said system comprising at least one auger conveyor assembly and a shuttle assembly, said at least one auger conveyor assembly comprising a substantially horizontal tube with an auger conveyor rotatably mounted therein, said horizontal tube having an inlet port for said polymer-coated powder and a discharge end therefor, a substantially vertical tube, said vertical tube having an upper end connected to said source of said polymer-coated powder and a lower end connected to said inlet port of said horizontal tube, prime mover means for rotating said auger conveyor within said horizontal tube to mix said polymer-coated powder therein and to convey said polymer-coated powder to the discharge end thereof, said shuttle assembly comprising a fixed portion mounted on said die supporting assembly of said compacting press and a moveable portion shiftable within said fixed portion, a shuttle hopper mounted on said fixed portion and having an upper end for receiving said polymer-coated powder from said at least one auger conveyor assembly and a lower powder discharging end, said discharge end of said at least one auger conveyor assembly horizontal tube overlying said upper receiving end of said shuttle hopper, said moveable shuttle portion carrying a cylindrical powder ring with an upper end for receiving said polymer-coated powder from said shuttle hopper and a lower powder discharging end, said moveable shuttle portion being shiftable between a retracted position wherein said lower end of said powder ring is closed by said die supporting assembly and said upper end of said powder ring communicates with said discharging end of said shuttle hopper, and an extended position wherein said discharging end of said shuttle hopper is closed by said moveable shuttle portion and said lower end of said powder ring communicates with said die cavity, means to shift said moveable shuttle portion between its retracted and extended positions, heating means affixed to and surrounding each of said vertical tube, said horizontal tube, said shuttle hopper and said powder ring to heat said polymer-coated powder to a temperature just below the coagulation point thereof by the time the polymer-coated powder is introduced into said die cavity.

2. In a compacting press having a die with a heated die cavity, a die supporting assembly and a ram cooperating with said die to make compacted parts, a system for heating and transferring polymer-coated powder from a source thereof to said die cavity, said system comprising a pair of substantially identical auger conveyor assemblies and a shuttle assembly, each of said auger conveyor assemblies comprising a substantially horizontal tube with an auger conveyor rotatably mounted therein, said horizontal tube of each auger conveyor assembly having an inlet port for said polymer-coated powder and a discharge end therefor, a substantially vertical tube for each of said auger conveyor assemblies, each vertical tube having an upper end connected to said source of said polymer-coated powder and a lower end connected to said inlet port of its respective auger conveyor assembly horizontal tube, a prime mover means for each auger conveyor assembly for rotating said auger conveyor thereof within said horizontal tube thereof to mix said polymer-coated powder therein and to convey said polymer-coated powder to the discharge end thereof, said shuttle assembly comprising a fixed portion mounted on said die supporting assembly of said compacting press and a moveable portion shiftable within said fixed portion, a shuttle hopper mounted on said fixed portion and having an upper end for receiving said polymer-coated powder from both of said auger conveyor assemblies, and a lower powder discharging end, said discharge end of each of said auger conveyor horizontal tubes overlying said upper receiving end of said shuttle hopper, said moveable shuttle portion carrying a cylindrical powder ring with an upper end for receiving said polymer-coated powder from said shuttle hopper, and a lower powder discharging end, said moveable shuttle portion being shiftable between a retracted position wherein said lower end of said powder ring is closed by said die supporting assembly and said upper end of said powder ring communicates with said discharging end of said shuttle hopper, and an extended position wherein said discharging end of said shuttle hopper is closed by said moveable shuttle portion and said lower end of said powder ring communicates with said die cavity, means to shift said moveable shuttle portion between its retracted and extended positions, heating means affixed to and surrounding each of said vertical tubes, said horizontal tubes, said shuttle hopper and said powder ring to heat said polymer-coated powder to a temperature just below the coagulation point thereof by the time said polymer-coated powder is introduced into said die cavity.

3. The structure claimed in claim 1 wherein said at least one auger conveyor assembly is shiftable between a working position with said vertical tube connected to said source of polymer-coated powder and said discharge end of said horizontal tube overlying said upper end of said shuttle hopper, and a position for cleaning, servicing and repair wherein said vertical tube is disconnected from said source of polymer-coated powder and said discharge end of said horizontal tube is remote from said shuttle hopper.

4. The structure claimed in claim 1 including a mounting assembly for mounting said at least one auger conveyor assembly, means on said mounting assembly for adjusting said horizontal tube of said at least one auger conveyor assembly axially to position said discharge end thereof with respect to said upper receiving end of said shuttle assembly hopper, and means on said mounting assembly to adjust said discharge end of said at least one auger conveyor assembly horizontal tube vertically with respect to said upper receiving end of said shuttle assembly hopper.

5. The structure claimed in claim 1 wherein said hating means for said vertical tube of said at least one auger conveyor assembly comprises a heating element extending thereabout and substantially the entire length thereof, said heating means for said horizontal tube of said at least one auger conveyor assembly comprising first and second horizontal tube heating elements, said first horizontal tube heating element extending thereabout and from said inlet port toward said discharge end thereof, said first horizontal tube heating element terminating at a point along said horizontal tube short of said discharge end thereof, said second horizontal tube heating element extending from said termination of said first horizontal tube heating element to said discharge end of said horizontal tube, said heating means for said shuttle hopper comprising a heating element extending thereabout, and said heating means for said powder ring comprising a heating element extending thereabout.

6. The structure claimed in claim 1 wherein said fixed portion of said shuttle assembly comprises a pair of elongated guide walls mounted on said die supporting assembly in parallel spaced relationship to either side of said die cavity, said guide walls having horizontal top surfaces and vertical opposed inner surfaces, an elongated rail affixed to and extending longitudinally on the top surface of each guide wall, each rail having a portion overhanging said inner surface of its respective guide wall and presenting a horizontal, longitudinal, downwardly facing rail surface, a riser block extending upwardly from each rail, said riser blocks supporting a hopper plate extending transversely of said guide walls, said shuttle assembly hopper mounted on said hopper plate midway between said guide walls, said movable portion of said shuttle assembly comprising a shuttle supporting said powder ring, said shuttle being slidably mounted on said die supporting assembly between said guide walls, a pair of roller assemblies mounted on said shuttle on either side thereof, and means to bias each of said roller assemblies against the adjacent one of said downwardly facing rail surfaces and to bias said shuttle against said die supporting assembly.

7. The structure claimed in claim 2 wherein each of said auger conveyor assemblies is shiftable between a working position with its respective vertical tube connected to said source of polymer-coated powder and said discharge end of its respective horizontal tube overlying said upper end of said shuttle hopper, and a position for cleaning, servicing and repair wherein its respective vertical tube is disconnected from said source of polymer-coated powder and said discharge end of its respective horizontal tube is remote from said shuttle hopper.

8. The structure claimed in claim 2 including a mounting assembly for mounting each of said auger conveyor assemblies, each of said mounting assemblies having means for adjusting said horizontal tube of its respective auger conveyor assembly axially to position said discharge end thereof with respect to said upper receiving end of said shuttle assembly hopper, each of said mounting assemblies having means to adjust said discharge end of said horizontal tube of its respective auger conveyor assembly vertically with respect to said upper receiving end of said shuttle assembly hopper.

9. The structure claimed in claim 2 wherein said heating means for said vertical tube of each of said auger conveyor assemblies comprises a heating element extending about its respective vertical tube and substantially the entire length thereof, said heating means for said horizontal tube of each of said auger conveyor assemblies comprises a first horizontal tube heating element extending about its respective horizontal tube and from said inlet port thereof to a point along its respective horizontal tube short of said discharge end thereof, and a second horizontal tube heating element extending from said first horizontal tube heating element to said discharge end of its respective horizontal tube, said heating means for said shuttle hopper comprising a heating element extending thereabout, and heating means for said powder ring comprising a heating element extending thereabout.

10. The structure claimed in claim 2 wherein said fixed portion of said shuttle assembly comprises a pair of elongated guide walls mounted on said die supporting assembly in parallel spaced relationship to either side of said die cavity, said guide walls having horizontal top surfaces and vertical opposed inner surfaces, an elongated rail affixed to and extending longitudinally on the top surface of each guide wall, each rail having a portion overhanging said inner surface of its respective guide wall and presenting a horizontal, longitudinal, downwardly facing rail surface, a riser block extending upwardly from each rail, said riser blocks supporting a hopper plate extending transversely of said guide walls, said shuttle assembly hopper mounted on said hopper plate midway between said guide walls, said movable portion of said shuttle assembly comprising a shuttle supporting said powder ring, said shuttle being slidably mounted on said die supporting assembly between said guide walls, a pair of roller assemblies mounted on said shuttle on either side thereof, and means to bias each of said roller assemblies against the adjacent one of said downwardly facing rail surfaces and to bias said shuttle against said die supporting assembly.

11. The structure claimed in claim 6 wherein said shuttle comprises a shuttle body with a bottom surface and upstanding sidewalls with horizontal upper edges, said shuttle body having a perforation accommodating said powder ring, a horizontal upper cut-off plate mounted on said upper edges of said shuttle body sidewalls, said upper cut-off plate having a perforation coaxial with said powder ring and a portion closing said discharging end of said shuttle hopper when said shuttle is in a position other than said retracted position, a lower shuttle plate affixed to said shuttle body bottom surface, bearing plate means affixed to said lower shuttle plate to contact said die supporting assembly, said lower shuttle plate and said bearing plate means having perforations therein coaxial with said powder ring, each of said roller assemblies comprising a roller bar having a central portion and ends, said roller bar supporting a roller at each of its ends, said central portion of each of said roller bars being shiftably attached to one of said sidewalls of said shuttle body, and a pair of compression springs for each roller bar abutting said bearing plate means sand said roller bar adjacent said rollers thereof to huge said bearing plate means against said die supporting assembly and said rollers against the adjacent one of said downwardly facing rail surfaces.

12. The structure claimed in claim 7 including a mounting assembly for mounting each of said auger conveyor assemblies, each of said mounting assemblies having means for adjusting said horizontal tube of its respective auger conveyor assembly axially to position said discharge end thereof with respect to said upper receiving end of said shuttle assembly hopper, each of said mounting assemblies having means to adjust said discharge end of said horizontal tube of its respective auger conveyor assembly vertically with respect to said upper receiving end of said shuttle assembly hopper.

13. The structure claimed in claim 10 wherein said shuttle comprises a shuttle body with a bottom surface and upstanding sidewalls with horizontal upper edges, said shuttle body having a perforation accommodating said powder ring, a horizontal upper cut-off plate mounted on said upper edges of said shuttle body sidewalls, said upper cut-off plate having a perforation coaxial with said powder ring and a portion closing said discharging end of said shuttle hopper when said shuttle is in a position other than said retracted position, a lower shuttle plate affixed to said shuttle body bottom surface, bearing plate means affixed to said lower shuttle plate to contact said die supporting assembly, said lower shuttle plate sand said bearing plate means having perforations therein coaxial with said powder ring, each of said roller assemblies comprising a roller bar having a central portion and ends, said roller bar supporting a roller at each of its ends, said central portion of each of said roller bars being shiftably attached to one of said sidewalls of said shuttle body, and a pair of compression springs for each roller bar abutting said bearing plate means and said roller bar adjacent said roller thereof to urge said bearing plate means against said die supporting assembly and said rollers against the adjacent one of said downwardly facing rail surfaces.

14. The structure claimed in claim 13 wherein said heating means for said vertical tube of each of said auger conveyor assemblies comprises a heating element extending about its respective vertical tube and substantially the entire length thereof, said heating means for said horizontal tube of each of said auger conveyor assemblies comprises a first horizontal tube heating element extending about tis respective horizontal tube and from said inlet port thereof to a point along its respective horizontal tube short of said discharge end thereof, and a second horizontal tube heating element extending from said first horizontal tube heating element to said discharge end of its respective horizontal tube, said heating means for said shuttle hopper comprising a heating element extending thereabout, and said heating means for said powder ring comprising a heating element extending thereabout.

15. The structure claimed in claim 14 wherein said fixed portion of said shuttle assembly comprises a pair of elongated guide walls mounted on said die supporting assembly in parallel spaced relationship to either side of said die cavity, said guide walls having horizontal top surfaces and vertical opposed inner surfaces, an elongated rail affixed to and extending longitudinally on the top surface of each guide wall, each rail having a portion overhanging said inner surface of its respective guide wall and presenting a horizontal, longitudinal, downwardly facing rail surface, a riser block extending upwardly from each rail, said riser blocks supporting a hopper plate extending transversely of said guide walls, said shuttle assembly hopper mounted on said hopper plate midway between said guide walls, said movable portion of said shuttle assembly comprising a shuttle supporting said powder ring, said shuttle being slidably mounted on said die supporting assembly between said guide walls, a pair of roller assemblies mounted on said shuttle on either side thereof, and means to bias each of said roller assemblies against the adjacent one of said downwardly facing rail surface and to bias said shuttle against said die supporting assembly.

16. The structure claimed in claim 15 wherein said shuttle comprises a shuttle body with a bottom surface and upstanding sidewalls with horizontal upper edges, said shuttle body having a perforation accommodating said powder ring, a horizontal upper cut-off plate mounted on said upper edges of said shuttle body sidewalls, said upper cut-off plate having a perforation coaxial with said powder ring and a portion closing said discharging end of said shuttle hopper when said shuttle is in a position other than said retracted position, a lower shuttle plate affixed to said shuttle body bottom surface, bearing plate means affixed to said lower shuttle plate to contact said die supporting assembly, said lower shuttle plate and said bearing plate means having perforations therein coaxial with said powder ring, each of said roller assemblies comprising a roller bar having a central portion and ends, said roller bar supporting a roller at each of its ends, said central portion of each of said roller bars being shiftably attached to one of said sidewalls of said shuttle body, and a pair of compression springs for each roller bar abutting said baring plate means and said roller bar adjacent said rollers thereto to urge said bearing plate means against said die supporting assembly and said rollers against the adjacent one of said downwardly facing rail surfaces.

* * * * *

UNITED STATES PATENT AND TRADEMARK OFFICE
CERTIFICATE OF CORRECTION

PATENT NO. : 5,213,816
DATED : May 25, 1993
INVENTOR(S) : Dale C. Smyth, Jr. & Michael A. Halley It is certified that error appears in the above—identified patent and that said Letters Patent is hereby corrected as shown below:

In column 10, line 37, [claim 2], insert "assembly" after --conveyor--

In column 12, line 68, [claim 11], "sand" should read --and--

In column 13, line 1, [claim 11], "huge" should read --urge--

In column 13, line 28, [claim 13], "sand" should read --and--

In column 13, line 47, [claim 14], "tis" should read --its--

Signed and Sealed this

Fifteenth Day of March, 1994

BRUCE LEHMAN

Attest:

Attesting Officer

Commissioner of Patents and Trademarks